(12) United States Patent
Kang et al.

(10) Patent No.: US 8,279,729 B2
(45) Date of Patent: Oct. 2, 2012

(54) CONTENT RECORDING METHOD AND APPARATUS

(75) Inventors: Man-Seok Kang, Suwon-si (KR); Joon-Hwan Kwon, Suwon-si (KR); Sung-Ryeul Rhyu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 12/994,794

(22) PCT Filed: May 25, 2009

(86) PCT No.: PCT/KR2009/002736
§ 371 (c)(1),
(2), (4) Date: Nov. 26, 2010

(87) PCT Pub. No.: WO2009/145530
PCT Pub. Date: Dec. 3, 2009

(65) Prior Publication Data
US 2011/0075536 A1 Mar. 31, 2011

(30) Foreign Application Priority Data
May 26, 2008 (KR) .................. 10-2008-0048675

(51) Int. Cl.
*G11B 7/00* (2006.01)
(52) U.S. Cl. .................................. 369/53.1; 369/53.15

(58) Field of Classification Search ............. 369/83, 369/84, 53.1, 53.12, 53.15, 53.17, 53.21; 386/46, 125; 725/141, 153
See application file for complete search history.

(56) References Cited

U.S. PATENT DOCUMENTS

| | | | |
|---|---|---|---|
| 6,011,761 A * | 1/2000 | Inoue | 705/26.1 |
| 6,931,198 B1 * | 8/2005 | Hamada et al. | 386/234 |
| 7,965,596 B2 * | 6/2011 | Ijtsma et al. | 369/47.13 |
| 2003/0152368 A1 | 8/2003 | Kitani | |
| 2005/0086488 A1 | 4/2005 | Kori et al. | |
| 2005/0273632 A1 | 12/2005 | Kawakami | |
| 2008/0101182 A1 * | 5/2008 | Chikaoka et al. | 369/47.14 |

FOREIGN PATENT DOCUMENTS

| | | |
|---|---|---|
| JP | 2003-242037 A | 8/2003 |
| JP | 2004-110302 A | 4/2004 |

OTHER PUBLICATIONS

International Search Report for PCT/KR2009/002736 issued Jan. 4, 2010 [PCT/ISA/210].

* cited by examiner

*Primary Examiner* — Nabil Hindi
(74) *Attorney, Agent, or Firm* — Sughrue Mion, PLLC

(57) ABSTRACT

A method and apparatus for recording contents. The method includes recording contents on a disc; verifying whether an error occurs in the recording; and reducing the number of available recordings of the contents, which is included in recording authority information, by 1, if an error does not occur in the recording. According to the method, if an error occurs in recording, the number of available recordings may be prevented from being unreasonably reduced.

8 Claims, 5 Drawing Sheets

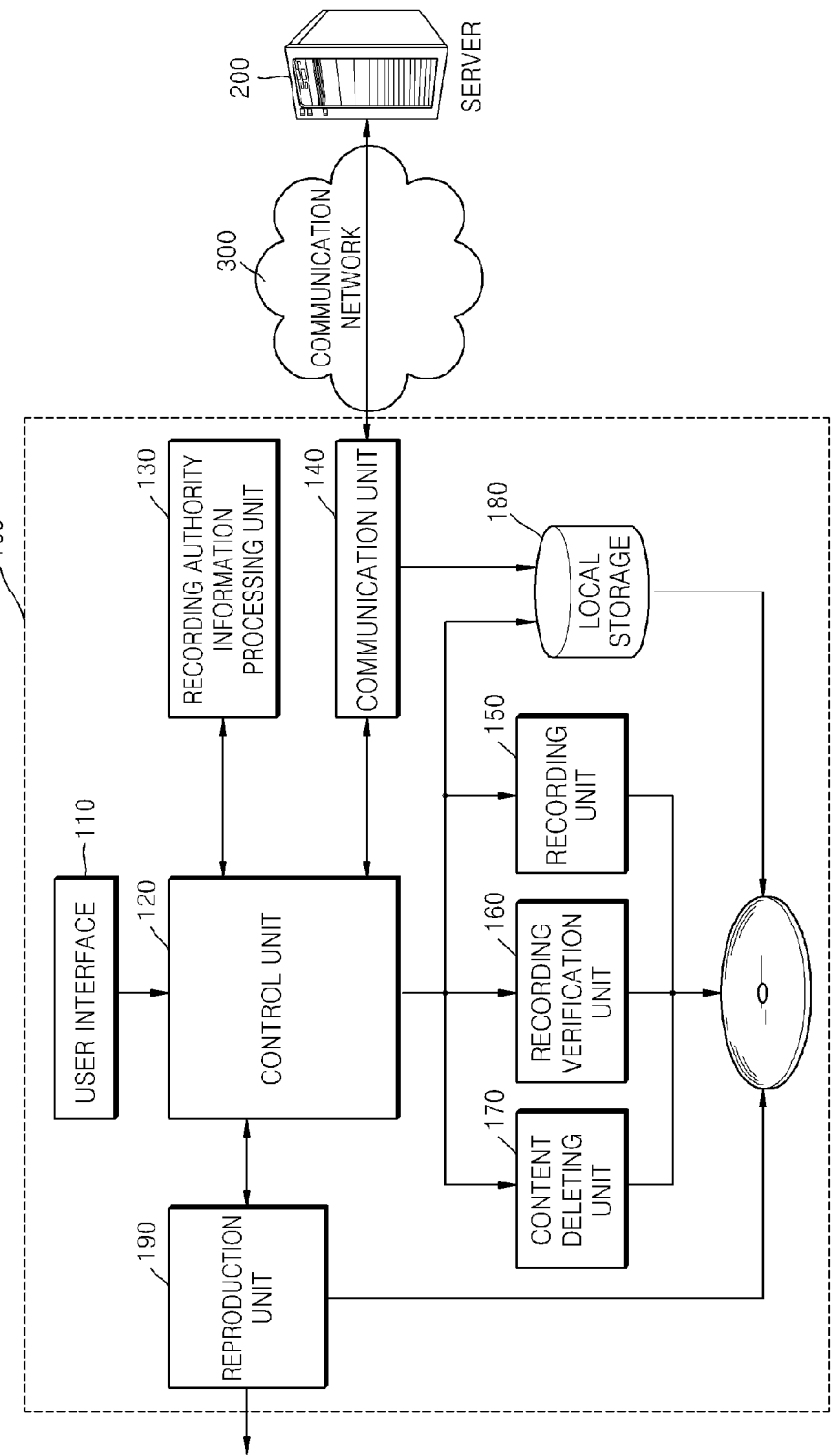

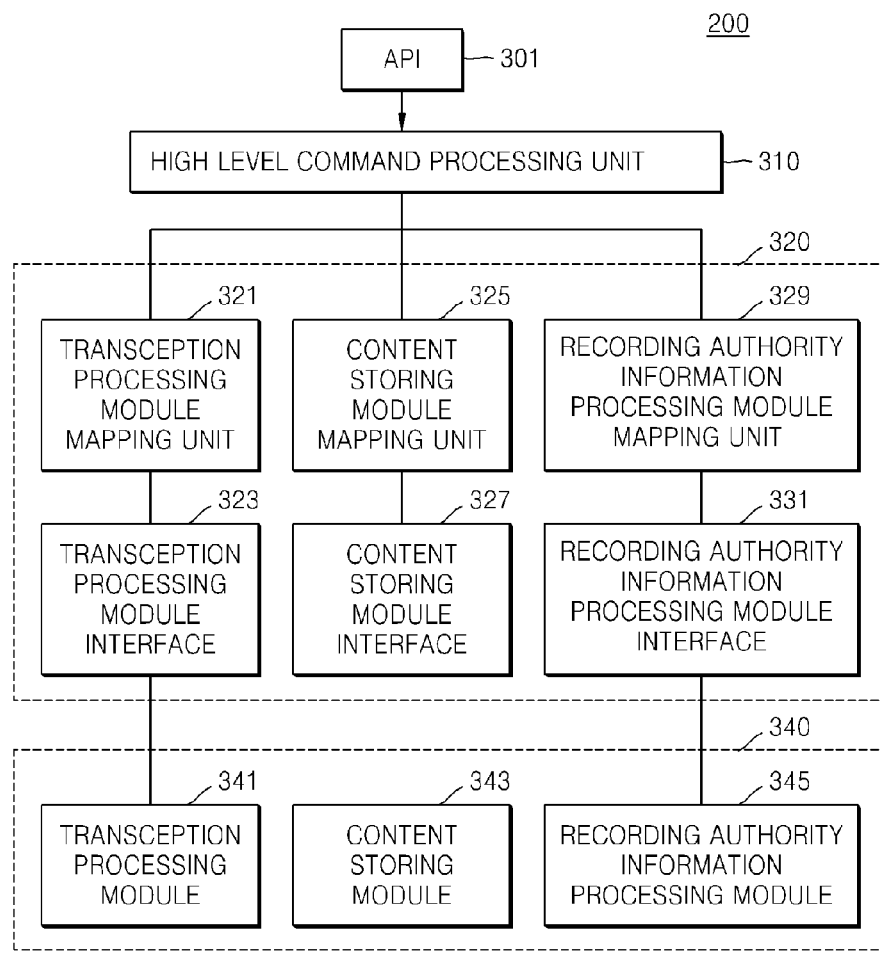

CONTENT RECORDING METHOD AND APPARATUS

CROSS-REFERENCE TO RELATED APPLICATIONS

This application is a National Stage of International Application No. PCT/KR2009/002736 filed May 25, 2009, which claims priority from Korean Patent Application No. 10-2008-0048675 filed on May 26, 2008, in the Korean Intellectual Property Office, the disclosures of which are incorporated herein by reference in their entireties.

BACKGROUND

1. Field

Exemplary embodiments consistent with the present invention relate to a method and apparatus for recording contents, and more particularly, to a method and apparatus for recording contents on a disc and processing that the contents are recorded only if error-less recording of contents is verified.

2. Description of Related Art

Various media signal recording devices, such as digital televisions (TVs), digital versatile disc (DVD) players, and computers, are broadly spreading. Also, due to the development of communication technologies, a large amount of data is transceivable via a wired or wireless communication network. A user may download contents from a server, i.e., a content provider, by using a media signal recording device, and may record the downloaded contents on a recording medium such as a hard disc in the media signal recording device or a disc inserted from outside the media signal recording device. A recording medium capable of recording a large amount of data includes a DVD or a Blu-ray disc (BD).

If contents are charged, a user may be authorized to use the contents after paying a predetermined charge. The user has to select, for example, a period for recording the contents on a disc or the number of available recordings of the contents, and has to pay for the selected period or the selected number of available recordings. A server generates recording authority information for using contents, for each user or recording device, based on information input by users. If a user records contents on a disc, a recording device reduces the number of available recordings included in the recording authority information by 1. The user may record the contents by the number of available recordings included in the recording authority information.

If it is determined that contents are recorded on a disc, a recording device or a server reduces the number of available recordings, which a user may record the contents on the disc, by 1. However, even when the contents are not properly recorded on the disc due to, for example, an error of the recording device or when the contents are completely recorded but are not reproducible, the contents are regarded as being completely recorded and thus the number of available recordings is reduced. That is, the user may have a disadvantage of a reduced number of available recordings even when the user may not record the contents on the disc or reproduce the contents recorded on the disc.

SUMMARY

The exemplary embodiments provide a method and apparatus for recording contents, verifying whether an error occurs in recording, and not reducing the number of available recordings if an error occurs.

The exemplary embodiments provide a method and apparatus for recording contents and increasing the number of available recordings, which is reduced if an error occurs in reproducing the completely recorded contents, so as to prevent the number of available recordings from being unreasonably reduced.

According to an aspect, there is provided a method of recording contents in a recording device, the method including recording contents on a disc; verifying whether an error occurs in the recording; and reducing the number of available recordings of the contents, which is included in recording authority information, by 1, if an error does not occur in the recording.

The method may further include indicating that the recording of the contents is started, by using a recording start indication identifier included in the recording authority information, if the recording of the contents is started; and indicating that the recording of the contents is completed, by using a recording completion indication identifier included in the recording authority information, if an error does not occur in the recording, and the reducing of the number of available recordings may include reducing the number of available recordings if the recording start indication identifier indicates that the recording of the contents is started, and the recording completion indication identifier indicates that an error does not occur in the recording.

The recording of the contents on the disc may include recording the contents on the disc if the number of available recordings included in the recording authority information is equal to or greater than 1.

The recording authority information may be stored in a user-inaccessible area of the recording device.

The method may further include deleting or modifying the contents recorded on the disc, if an error occurs in the recording.

The deleting or modifying of the contents may include modifying the contents recorded on the disc by re-recording arbitrary data on the disc.

The re-recording of the arbitrary data may include re-recording the arbitrary data by using a second recording signal having an intensity equal to or greater than an intensity of a first recording signal used to record the contents.

The deleting or modifying of the contents may include physically damaging a surface of the disc on which the contents are recorded, so as to make the contents irreproducible.

The deleting or modifying of the contents may include treating an area in which the contents are recorded, as a defect area, recording information regarding the defect area, in a defect list recorded in a disc management area (DMA) of the disc, and thus updating the defect list.

According to another aspect, there is provided a method of recording contents, the method including reproducing contents recorded on a disc; deleting or modifying the contents recorded on the disc, if an error occurs in the reproducing; and increasing the number of available recordings of the contents, which is included in recording authority information, by 1, if the contents are deleted or modified.

The deleting or modifying of the contents may include determining whether the recording authority information of the contents exists in a device; and deleting or modifying the contents if the recording authority information exists in the device.

The deleting or modifying of the contents may include modifying the contents recorded on the disc, by re-recording arbitrary data on the disc.

The re-recording of the arbitrary data may include re-recording the arbitrary data by using a second recording signal having an intensity equal to or greater than an intensity of a first recording signal used to record the contents.

The deleting or modifying of the contents may include physically damaging a surface of the disc on which the contents are recorded, so as to make the contents irreproducible.

According to another aspect, there is provided a method of recording contents, the method including receiving a confirmation whether recording of contents is authorized, from a server that communicates via a communication network; recording the contents on a disc if the confirmation that the recording is authorized is received from the server; verifying whether an error occurs in the recording; informing the server that an error does not occur in the recording, if an error does not occur in the recording; and deleting or modifying the contents recorded on the disc, if an error occurs in the recording.

According to another aspect, there is provided a method of recording contents, the method including reproducing contents recorded on a disc; deleting or modifying the contents recorded on the disc, if an error occurs in the reproducing; and informing the server that an error occurs in the reproducing and that the contents are deleted or modified.

According to another aspect, there is provided a method of permitting recording of contents in a server that communicates with a recording device via a communication network, the method including receiving from the recording device a request to confirm whether recording of contents is authorized; determining whether the recording device is authorized to record the contents, by using recording authority information of the recording device, which is stored in the server, and informing the recording device about a result of the determining; being informed by the recording device that the contents are recorded without an error, if the recording device is authorized; and reducing the number of available recordings included in the recording authority information by 1.

According to another aspect, there is provided a method of permitting recording of contents in a server that communicates with a recording device via a communication network, the method including being informed by the recording device that an error occurs in reproducing contents; being informed by the recording device that the contents are deleted or modified; and increasing the number of available recordings of the recording device, which is included in the recording authority information, by 1.

According to another aspect, there is provided a recording device including a recording unit for recording contents on a disc; a recording verification unit for verifying whether an error occurs in the recording; a recording authority information processing unit for managing recording authority information of the contents; and a control unit for controlling the recording authority information processing unit to reduce the number of available recordings included in the recording authority information by 1, if an error does not occur in the recording.

According to another aspect, there is provided a recording device including a reproduction unit for reproducing contents recorded on a disc; a content deleting unit for deleting or modifying the contents recorded on the disc, if an error occurs in the reproducing; a recording authority information processing unit for managing recording authority information of the contents; and a control unit for controlling the recording authority information processing unit to increase the number of available recordings of the contents, which is included in the recording authority information, by 1, if the contents are deleted or modified.

According to another aspect, there is provided a recording device including a communication unit for communicating with a server; and a control unit for performing control to record contents on a disc, if a confirmation that recording of the contents is authorized is received from the server, to verify whether an error occurs in the recording, to inform the server that an error does not occur in the recording, if an error does not occur in the recording, and to delete or modify the contents recorded on the disc, if an error occurs in the recording.

According to another aspect, there is provided a computer readable recording medium having recorded thereon a computer program for executing a method of recording contents, the method including recording contents on a disc; verifying whether an error occurs in the recording; and reducing the number of available recordings of the contents, which is included in recording authority information, by 1, if an error does not occur in the recording.

According to another aspect, there is provided a computer readable recording medium having recorded thereon a computer program for executing a method of recording contents, the method including reproducing contents recorded on a disc; deleting or modifying the contents recorded on the disc, if an error occurs in the reproducing; and increasing the number of available recordings of the contents, which is included in recording authority information, by 1, if the contents are deleted or modified.

According to another aspect, there is a method of recording contents in a recording device, the method including: recording contents on a disc; determining whether there is an error in the contents recorded on the disc; and reducing a number of permissible recordings of the contents by 1, if there is no error in the contents recorded on the disc, the number of permissible recordings being included in recording authority information.

Further, the recording authority information includes the number of permissible recordings, a recording start indication identifier which indicates whether the recording the contents is started, a completion indication identifier which indicates whether the recording of the contents is completed and there is no error in the contents recorded on the disc, wherein the reducing of the number of permissible recordings includes reducing the number of permissible recordings if the recording start indication identifier indicates that the recording is started, and the recording completion indication identifier indicates that the recording is completed and there is no error in the contents recorded on the disc.

According to an exemplary embodiment, a method and apparatus for recording contents on a disc, verifying whether an error occurs in recording, and not reducing the number of available recordings if an error occurs may be provided.

Also, according to an exemplary embodiment, a method and apparatus for recording contents and increasing the number of available recordings, which is reduced if an error occurs in reproducing the completely recorded contents, so as to prevent the number of available recordings from being unreasonably reduced may be provided.

BRIEF DESCRIPTION OF THE DRAWINGS

FIG. 2 is a block diagram of a recording device illustrated in FIG. 1;

FIG. 3 is a structural view of modules for performing a recording permission method in a server illustrated in FIG. 1, according to an exemplary embodiment;

FIG. 4 is a diagram showing recording authority information according to an exemplary embodiment;

DETAILED DESCRIPTION

Hereinafter, the exemplary embodiments will be described in detail with reference to the attached drawings.

Figure 1:
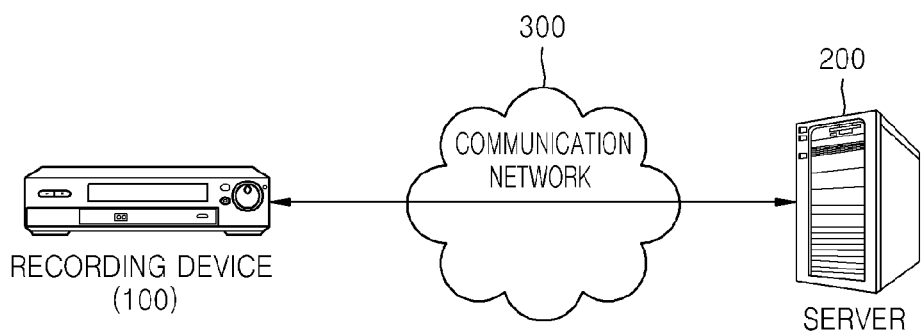
FIG. 1 is a schematic diagram of a content recording system according to an exemplary embodiment.

FIG. 1 is a schematic diagram of a content recording system according to an exemplary embodiment. Referring to FIG. 1, the content recording system includes a recording device 100, a server 200, and a communication network 300.

The recording device 100 may transmit and receive data to and from the server 200 via the communication network 300. The communication network 300 includes a wired or wireless communication network. The recording device 100 is a device for recording on a recording medium contents received from the server 200 and reproducing the contents, and includes a digital TV, a computer, a digital versatile disc (DVD) player, etc. The server 200 is operated by a content provider, such as a broadcasting station or a general content generator, and stores contents, such as audio signals, video signals, text signals, or metadata signals thereof, and encrypted title keys for decrypting encrypted contents. The server 200 extracts contents requested by a user and provides the contents to the user. Although a content providing function is performed by the server 200 in FIG. 1, in some cases, a database (not shown) may function as the server 200. The server 200 may transmit to the recording device 100 encrypted contents and encrypted title keys for decrypting the encrypted contents.

A title key is a unique value given to every title, e.g., contents, and is used to decrypt encrypted data of a whole title or a portion of the title. In an exemplary embodiment, titles are contents. An encrypted title key is a title key encrypted by using a disc key. A disc key is a value given to every disc, and is information for decrypting an encrypted title key. A disc key is encrypted by using player keys and is recorded in a lead-in area of a disc.

The recording device 100 reads an encrypted disc key from a lead-in area of a loaded disc, extracts a disc key by decrypting the encrypted disc key by using a unique player key of the recording device 100, and transmits the extracted disc key to the server 200 via the communication network 300. The server 200 may encrypt a title key of contents that a user desires to record, by using the disc key received from the recording device 100, so as to generate an encrypted title key, and may transmit the encrypted title key to the recording device 100 together with scrambled contents or separately from the scrambled contents. The recording device 100 may include and manage the encrypted title key received from the server 200, into content recording authority information.

In some cases, the recording device 100 may receive from the server 200 a title key for decrypting contents, and may encrypt the received title key by using a disc key of a disc for recording the contents, so as to generate an encrypted title key. That is, a disc key may be extracted from each disc, a title key may be encrypted by using the extracted disc key, and thus contents may be recorded on the disc together with the encrypted title key. In an exemplary embodiment, for convenience sake, the encrypted title key is referred to as an encryption key.

In order to record contents on a disc, the recording device 100 accesses the server 200 for a login and charge payment and requests the server 200 for an authority for recording contents. The server 200 generates recording authority information for each user or each recording device 100. The server 200 may store the generated recording authority information in the server 200 or transmit the generated recording authority information to the recording device 100. The recording authority information is as illustrated in FIG. 4.

Referring to FIG. 4, the recording authority information represents that a certain user or a certain recording device 100 has an authority, i.e., a license or an authorization, to record predetermined contents, and includes a content identifier which indicates contents authorized to be recorded, and the number of available recordings which indicates the number of times that predetermined contents are recordable. The number of available recordings is information representing the number of times that a user can record contents on a disc, and may be set according to the charge paid by the user when the recording authority information is generated.

In some cases, the recording authority information may include an encryption key for decrypting contents, a recording start indication identifier for indicating whether recording of contents is started, and a recording completion indication identifier for indicating whether the recording of the content is completed.

The recording start indication identifier may be generated in the recording authority information regarding corresponding contents immediately if recording is started. Similarly, the recording completion indication identifier may be generated in the recording authority information if recording is finished and error-less recording is verified. In an exemplary embodiment, completion of recording does not mean that recording of contents on a disc is merely finished, but means that recording of contents on a disc is finished and then error-less recording of contents is verified. If both the recording start indication identifier and the recording completion indication identifier are generated in the recording authority information, the recording device 100 or the server 200 may determine that recording is completed and may reduce the number of available recordings by 1.

In some cases, the recording start indication identifier may be included from the beginning in the recording authority information with an initialized value, and may change the value if recording is started, so as to indicate the start of recording. Also, the recording completion indication identifier may be included from the beginning in the recording authority information with an initialized value, and may change the value if recording is completed, so as to indicate the completion of recording. For example, both the recording start indication identifier and the recording completion indication identifier may be initialized with a value 0 and then may be changed to a value 1 if recording is started and completed, respectively. If both the recording start indication identifier and the recording completion indication identifier have a value 1, the recording device 100 or the server 200 may determine that recording is completed and may reduce the number of available recordings by 1.

If the server 200 transmits the recording authority information to the recording device 100, the recording device 100 stores the recording authority information in a user-inaccessible area so as to prevent the recording authority information from being changed or modified by a user.

If a user commands to record contents, the recording device 100 extracts a content identifier from contents that the user desires to record and searches the recording device 100 for recording authority information including the extracted content identifier. The recording device 100 determines whether the contents are recordable on a disc, by using the number of available recordings included in the found recording authority information. If the number of available recordings is 1, the recording device 100 determines that the contents are recordable, and records encrypted contents on the disc together with an encryption key of the contents. Recording of contents on a recording medium does not mean that only encrypted contents are recorded on the recording medium, but means that encrypted contents and an encryption key for decrypting the encrypted contents to reproduce the contents are recorded together on the recording medium. This is because contents are recorded on a recording medium in order to reproduce the contents later by using a reproduction device, and thus recording of contents is valid only if contents and an encryption key for reproducing the contents are recorded together.

If recording is performed, the recording device 100 indicates that recording is started, by using a recording start indication identifier included in the recording authority information. After recording is performed, the recording device 100 verifies whether an error occurs in recording and, if it is determined that an error does not occur, indicates that recording is completed, by using a recording completion indication identifier included in the recording authority information. If the recording start indication identifier indicates that recording of contents is started, and the recording completion indication identifier indicates that an error does not occur in recording, the recording device 100 reduces the number of available recordings by 1. Otherwise, if it is determined that an error occurs in recording, the recording device 100 deletes the contents recorded on a disc. As such, misuse of contents may be prevented and thus rights and interests of copyright holders of the contents may be protected.

After that, if the disc is loaded into the recording device 100 and a disc reproduction command is received from a user, the recording device 100 reproduces the contents recorded on the disc. If an error occurs in reproducing the contents, the recording device 100 deletes the contents recorded on the disc and then increases the number of available recordings of the contents, which is included in the recording authority information. As such, if an error occurs in reproducing completely recorded contents, the number of available recordings may be prevented from being unreasonably reduced.

If the server 200 does not transmit the recording authority information to the recording device 100 and stores the recording authority information in the server 200, a user may request the server 200 to transmit an encryption key of contents. If the user is authorized, the server 200 determines whether the user may record the contents on a disc, by using the number of available recordings of the user, which is included in the recording authority information. If the number of available recordings is equal to or greater than 1, the server 200 may extract the encryption key of the contents from the recording authority information and may transmit the extracted encryption key to the recording device 100. In some cases, the recording device 100 may transmit to the server 200 a disc key of a disc for recording contents, and may receive from the server 200 an encryption key obtained by encrypting a title key of the contents by using the disc key.

The recording device 100 records the contents on the disc and informs the server 200, i.e., the recording device 100 sends information to the server 200, about the recording of contents at the same time. If the contents are recorded, the recording device 100 verifies whether an error occurs in recording. If it is determined that an error occurs, the recording device 100 deletes the recorded contents from the disc. If it is determined that an error does not occur, the recording device 100 informs the server 200, i.e., the recording device 100 sends information to the server 200, that an error does not occur. The server 200 is informed by the recording device 100 that recording is completed, and reduces the number of available recordings included in the recording authority information by 1.

If an error occurs in reproducing the contents, the recording device 100 deletes the contents recorded on the disc. As such, rights and interests of content producers or server providers may be protected and unauthorized use of contents may be prevented. The recording device 100 informs the server 200, i.e., the recording device 100 sends to the server 200 information, that an error occurs in reproducing contents and the contents are completely deleted. If the recording device 100 informs that an error occurs in reproducing contents and the contents are completely deleted from the disc, the server 200 increases the number of available recordings included in the recording authority information by 1.

FIG. 2 is a block diagram of the recording device 100 illustrated in FIG. 1. Referring to FIG. 2, the recording device 100 includes a user interface 110, a control unit 120, a recording authority information processing unit 130, a communication unit 140, a recording unit 150, a recording verification unit 160, a content deleting unit 170, a local storage 180, and a reproduction unit 190. As illustrated in FIG. 1, the recording device 100 may transmit and receive data to and from the server 200 via the communication network 300.

The user interface 110 interfaces with a user. The user interface 110 receives a command from the user in the form of a text, a number, or a voice, and transmits the commands to the control unit 120. The user interface 110 may include a physical transducer, such as a keyboard, a mouse, a touchscreen, or a microphone.

The recording authority information processing unit 130 stores recording authority information received from the server 200. As described above in relation to FIG. 1, the server 200 may generate recording authority information for each user or each recording device 100, and may store and manage the generated recording authority information in the server 200 or transmit the generated recording authority information to the recording device 100. If the server 200 transmits the recording authority information to the recording device 100, the recording authority information processing unit 130 stores and manages the received recording authority information. The recording authority information processing unit 130 may be located in a user-inaccessible area of the recording device 100 so that the user is unable to manipulate the number of available recordings, etc.

As described above in relation to FIG. 4, the recording authority information represents an authority for recording contents on a disc, and includes a content identifier and the number of available recordings of contents. Also, the recording authority information may further include an encryption key for decrypting encrypted contents, a recording start indication identifier for indicating that recording of contents is started, and a recording completion indication identifier for indicating that the recording of contents is completed if an error does not occur in recording. If recording of contents on a disc is started, the recording authority information processing unit 130 generates the recording start indication identifier in the recording authority information, or changes the recording start indication identifier already included in the recording authority information from a value 0 to a value 1. If the recording of contents on the disc is finished and an error does not occur in the recorded contents, the recording authority information processing unit 130 generates the recording completion indication identifier in the recording authority information, or changes the recording completion indication identifier already included in the recording authority information from a value 0 to a value 1. If the recording start indication identifier and the recording completion indication identifier indicate that the recording of contents is completed, the recording authority information processing unit 130 reduces the number of available recordings by 1.

If the recorded contents are not reproducible and thus are deleted from the disc by the content deleting unit 170, the recording authority information processing unit 130 increases the number of available recordings included in the recording authority information by 1.

The control unit 120 controls overall operations of the recording device 100 to perform a content recording method according to an exemplary embodiment. The control unit 120 may include an arithmetic logic unit (ALU) for calculations, and a register for temporarily storing data and commands.

If the user commands via the user interface 110 to record the contents and the encryption key on the disc, the control unit 120 controls the recording unit 150 to record the encrypted contents and the encryption key on the disc. If the recording is completed, the control unit 120 controls the recording verification unit 160 to verify whether the contents are recorded on the disc without an error. If it is determined that an error occurs in recording the contents, the control unit 120 controls the content deleting unit 170 to delete the contents recorded on the disc.

If the user commands via the user interface 110 to reproduce the contents recorded on the disc, the control unit 120 controls the reproduction unit 190 to read and reproduce the contents from the disc loaded in the recording device 100. If an error occurs in reproducing the contents, the control unit 120 is informed by the reproduction unit 190 that an error occurs, and determines whether the recording authority information regarding the contents is stored in the recording authority information processing unit 130. If the recording authority information processing unit 130 includes the recording authority information including the content identifier of the contents, the control unit 120 controls the content deleting unit 170 to delete the contents recorded on the disc. If the content deleting unit 170 deletes the contents, the control unit 120 controls the recording authority information processing unit 130 to increase the number of available recordings of the contents, which is included in the recording authority information, by 1.

The communication unit 140 requests the server 200 or database (not shown) for user-desired contents and an encryption key for reproducing the contents, via the communication network 300, and correspondingly receives the contents and the encryption key from the server 200 or the database. In some cases, the communication unit 140 may transmit to the server 200 a disc key of a disc for recording contents, and may receive from the server 200 an encryption key generated by encrypting a title key of certain contents by using the disc key.

If the communication unit 140 performs wireless communication, the communication unit 140 may include a wireless signal transceiver (not shown), a baseband processing unit (not shown), and a link control unit (not shown). The baseband processing unit and the link control unit may be connected to the control unit 120 via a host control interface (HCI) and may transmit and receive control commands and transceive data by transmitting and receiving HCI packets to and from the control unit 120. A wireless local area network (WLAN), Bluetooth, Zigbee, wireless broadband (WiBro), etc. may be used for wireless communication.

The recording unit 150 records contents stored in the local storage 180, on the disc together with an encryption key of the contents. The recording verification unit 160 verifies whether an error occurs in the contents recorded on the disc.

If an error occurs in recording or reproducing, the content deleting unit 170 deletes the contents from the disc. The content deleting unit 170 may record data having a meaningless pattern, such as a value 0 or 1, on the disc on which the contents are recorded, so as to modify the contents recorded on the disc. In this case, a recording signal used to record the data having a meaningless pattern may have an intensity equal to or greater than that of a recording signal used to record the contents. The content deleting unit 170 may receive a blank command from the control unit 120 to delete the contents recorded on the disc. Alternatively, the content deleting unit 170 may physically damage a surface of the disc on which the contents are recorded, so as to make the contents unreadable. Otherwise, the content deleting unit 170 may treat a content recorded area as a logical defect area and may update information regarding the defect area. A lead-in or lead-out area of the disc may include a disc management area (DMA) on which a defect list including information regarding defects generated while the disc is used, information regarding management of the defects, etc. is recorded. If an error occurs in recording or reproducing, the content deleting unit 170 may treat an area, in which the contents are recorded, as the defect area, and may modify the defect list recorded in the DMA. That is, the content deleting unit 170 updates the defect list recorded in the DMA by reflecting information regarding an area in which the contents are recorded, e.g., location information of the defect area in which the contents are recorded, to the defect list.

The recording device 100 may be configured to be able to delete and re-record data regardless of the type of disc such that the contents may be deleted even if the disc is a one-time recordable disc or a read-only disc.

The local storage 180 stores contents received from the server 200.

The reproduction unit 190 reads data from the disc, decodes the read data to an outputable format, and reproduces the decoded data. If an error occurs in reproducing the contents, the reproduction unit 190 informs the control unit 120, i.e., the reproduction unit 190 sends to the control unit 120 information, about the occurrence of the error so that the contents recorded on the disc are deleted. Also, the reproduction unit 190 may output by using a screen or a speaker, for example, an overall state of the recording device 100 or information input by the user via the user interface 110. The reproduction unit 190 includes a display unit (not shown) for outputting a video signal, a speaker (not shown) for outputting an audio signal, etc., and outputs information read from the disc inserted into the recording device 100 or data downloaded from the server 200. The reproduction unit 190 may include an on-screen display (OSD) processing unit for generating and outputting a user control list, etc.

FIG. 3 is a structural view of modules for performing a recording permission method in the server 200 illustrated in FIG. 1, according to an exemplary embodiment. Referring to FIG. 3, the server 200 includes a transceiver processing module 341, a content storing module 343, and a recording authority information processing module 345. The transceiver processing module 341 communicates with the recording device 100, and the content storing module 343 stores and manages various contents and title keys of encrypted contents.

The recording authority information processing module 345 generates recording authority information in correspondence with requests of users and stores the recording authority information for each user or each recording device 100. After that, if a user performs a login, the recording authority information processing module 345 determines whether the user is authorized and, if the user is authorized, determines whether the user can record contents, by using the number of available recordings included in the recording authority information. The transceiver processing module 341, the content storing module 343, and the recording authority information processing module 345 are application modules 340.

Overall configuration of the server 200 will now be described with reference to the above-described application modules 340. The server 200 may use one of various operating systems (OSs). The OS provides a high level command to an application program interface (API) 301 to control operation of each of the application modules 340. The server 200 includes a high level command processing unit 310 for identifying an application module 340 corresponding to the high level command provided from the API 301, and decoding the high level command and providing the decoded high level command to the corresponding application module 340.

An application module control unit 320 controls operations of the application modules 340 according to commands provided from the high level command processing unit 310. That is, the high level command processing unit 310 identifies whether an application module 340 corresponding to the high level command provided from the API 310 exists and, if the corresponding application module 340 exists, decodes the high level commands to a command recognizable by the corresponding application module 340 to transmit the decoded command or a message to a corresponding mapping unit. Accordingly, the application module control unit 320 includes a transceiver processing module mapping unit 321, a content storing module mapping unit 325, and a recording authority information processing module mapping unit 329, and a transceiver processing module interface 323, a content storing module interface 327, and a recording authority information processing module interface 331, which respectively correspond to the transceiver processing module 341, the content storing module 343, and the recording authority information processing module 345.

The transceiver processing module mapping unit 321 receives from the high level command processing unit 310 a high level command for communicating with the recording device 100, maps the high level command to a device level command processable by the transceiver processing module 341, and provides the device level command to the transceiver processing module 341 via the transceiver processing module interface 323.

The content storing module mapping unit 325 and the content storing module interface 327 store various contents and title keys, and search for contents requested by a user. The content storing module mapping unit 325 receives from the high level command processing unit 310 a high level command for utilizing the content storing module 343, maps the high level command to a device level command, and provides the device level command to the content storing module 343 via the content storing module interface 327.

The recording authority information processing module 345 generates the recording authority information for each user, and transmits the recording authority information to the recording device 100 or directly manages the recording authority information. The recording authority information processing module mapping unit 329 receives a high level command from the high level command processing unit 310, and maps the high level command to a device level command recognizable by the recording authority information processing module 345. The device level command is provided to the recording authority information processing module 345 via the recording authority information processing module interface 331.

Figure 5:
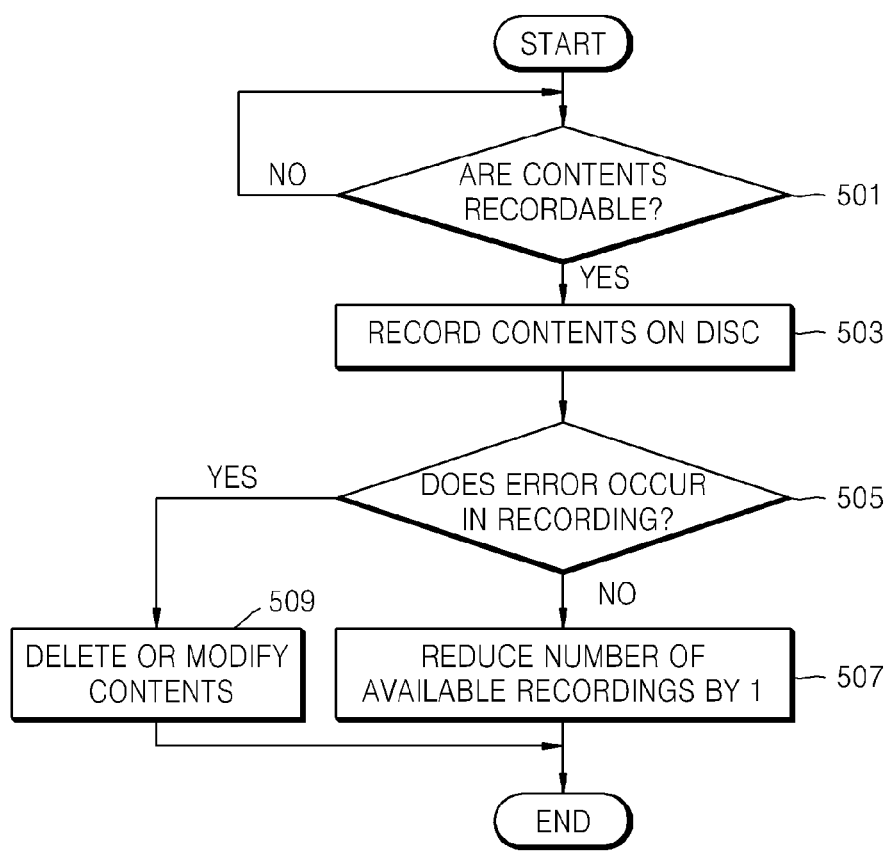
FIG. 5 is a flowchart of a method of recording contents, according to an exemplary embodiment.

FIG. 5 is a flowchart of a method of recording contents, according to an exemplary embodiment. Referring to FIG. 5, a user commands via the user interface 110 to record contents on a loaded disc, the recording device 100 determines whether the user is authorized to record predetermined contents on a predetermined disc, by using recording authority information stored in the recording device 100 (operation 501). If the recording authority information is stored in the server 200, the recording device 100 accesses the server 200 via the communication unit 140 to perform user authentication, and requests the server 200 to determine whether the user is authorized to record contents. The server 200 extracts the recording authority information stored for each user or each recording device 100, performs user authentication by using the extracted recording authority information, determines whether recording of contents is available, by using the number of available recordings included in the recording authority information, and informs the recording device 100, i.e., the server 200 sends information to the recording device 100, about the determination result.

If the number of available recordings included in the recording authority information is equal to or greater than 1, the recording device 100 determines that the recording of contents is available, and records the contents on the disc (operation 503). After the contents are recorded on the disc, the recording device 100 verifies whether an error occurs in recording (operation 505). If it is determined that an error occurs in recording the contents, the recording device 100 deletes or modifies the contents recorded on the disc (operation 509). In order to delete or modify the contents recorded on the disc, the recording device 100 may re-record a signal having a meaningless pattern on the disc on which the contents are recorded, or may treat an area in which the contents are recorded, as a defect area, add location information of the defect area into a defect list recorded in a DMA, and thus update the defect list.

Otherwise, if the recording authority information is stored in the recording device 100 and it is determined that an error does not occur in recording, the recording device 100 reduces the number of available recordings included in the recording authority information by 1 (operation 507). If the recording authority information is stored in the server 200, the recording device 100 informs the server 200, i.e., the recording device 100 sends information to the server 200, that the contents are completely recorded. The server 200 increases the number of recording authorizations included in the recording authority information by 1.

Figure 6:
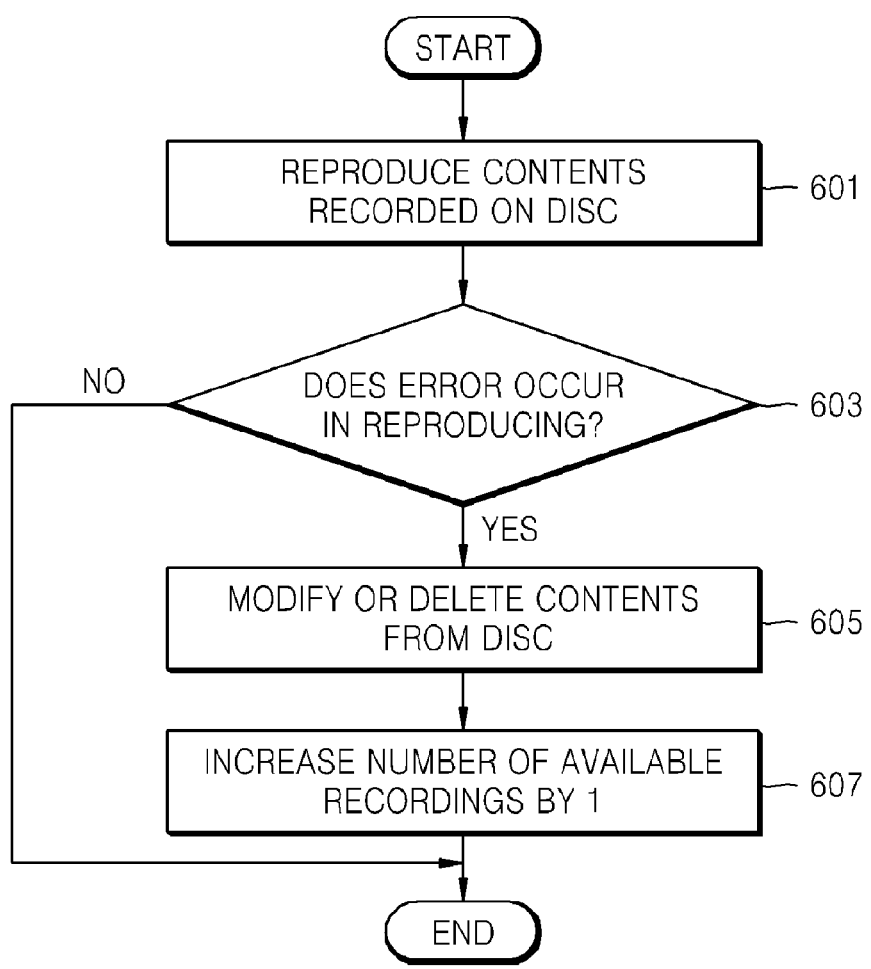
FIG. 6 is a flowchart of a method of recording contents, according to another exemplary embodiment.

FIG. 6 is a flowchart of a method of recording contents, according to another exemplary embodiment. Referring to FIG. 6, the recording device 100 reproduces contents recorded on a disc, according to a disc reproduction command of a user (operation 601). If an error occurs in reproducing the contents (operation 603), the recording device 100 modifies or deletes the contents from the disc (operation 605). The recording device 100 increases the number of available recordings included in the recording authority information by 1 (operation 607). If the server 200 includes the recording authority information, the recording device 100 informs the server 200, i.e., the recording device 100 sends information to the server 200, that an error occurs in reproducing and that the contents having the error are deleted from the disc. The server 200 is informed by the recording device 100 that reproducing of the contents is not available and that the contents are deleted from the disc, and increases the number of available recordings included in the recording authority information by 1.

The present invention can also be implemented as computer-readable code on a computer-readable recording medium or as a computer processor. The computer-readable recording medium is any data storage device that can store data which can be thereafter read by a computer system. Examples of the computer-readable recording medium include read-only memory (ROM), random-access memory (RAM), CD-ROMs, magnetic tapes, floppy discs, optical data storage devices, etc. The computer-readable recording medium can also be distributed over network-coupled computer systems so that the computer-readable code is stored and executed in a distributed fashion. Also, functional programs, codes, and code segments for accomplishing the present invention can be easily construed by programmers of ordinary skill in the art to which the present invention pertains.

The invention claimed is:

1. A method of recording contents in a recording device, the method comprising:
   recording contents on a disc;
   verifying whether an error occurs in the recording;
   reducing a number of available recordings of the contents by 1, if an error does not occur in the recording, the number of available recordings being included in recording authority information; and
   deleting or modifying the contents recorded on the disc, if the error occurs in the recording,
   wherein the deleting or modifying of the contents comprises physically damaging a surface of the disc on which the contents are recorded, so the contents are irreproducible.

2. The method of claim 1, further comprising:
   indicating that the recording of the contents is started, by using a recording start indication identifier in the recording authority information, if the recording of the contents is started; and
   indicating that the recording of the contents is completed, by using a recording completion indication identifier in the recording authority information, if an error does not occur in the recording,
   wherein the reducing of the number of available recordings comprises reducing the number of available recordings if the recording start indication identifier indicates that the recording of the contents is started, and the recording completion indication identifier indicates that the error does not occur in the recording.

3. The method of claim 1, wherein the recording of the contents on the disc comprises recording the contents on the disc if the number of available recordings in the recording authority information is equal to or greater than 1.

4. The method of claim 1, wherein the recording authority information is stored in a user-inaccessible area of the recording device.

5. A method of recording contents, the method comprising:
   reproducing contents recorded on a disc;
   deleting or modifying the contents recorded on the disc, if an error occurs in the reproducing; and
   increasing a number of available recordings of the contents by 1, if the contents are deleted or modified, the number of available recordings being included in recording authority information.

6. The method of claim 5, wherein the deleting or modifying of the contents comprises:
   determining whether the recording authority information of the contents exists in a device; and
   deleting or modifying the contents if the recording authority information exists in the device.

7. A method of permitting recording of contents in a server that communicates with a recording device via a communication network, the method comprising:
   receiving from the recording device a request to confirm whether recording of contents is authorized;
   determining whether the recording device is authorized to record the contents, by using recording authority information of the recording device, which is stored in the server, and communicating a result of the determining to the recording device;
   being informed by the recording device that the contents are recorded without an error, if the recording device is authorized; and
   reducing the number of available recordings by 1;
   being informed by the recording device that an error occurs in reproducing contents;
   being informed by the recording device that the contents are deleted or modified; and
   increasing the number of available recordings of the recording device by 1,
   wherein the recording authority information comprises the number of available recordings.

8. A recording device comprising:
   a reproduction unit which reproduces contents recorded on a disc;
   a content deleting unit which deletes or modifies the contents recorded on the disc, if an error occurs in the reproducing;
   a recording authority information processing unit which manages recording authority information of the contents; and
   a control unit which controls the recording authority information processing unit to increase a number of available recordings of the contents by 1, if the contents are deleted or modified,
   wherein the recording authority information comprises the number of available recordings of the contents.

* * * * *